Feb. 26, 1963     B. W. CAMPBELL ET AL     3,078,969
DAMPED BEAM
Filed June 15, 1959     2 Sheets-Sheet 1
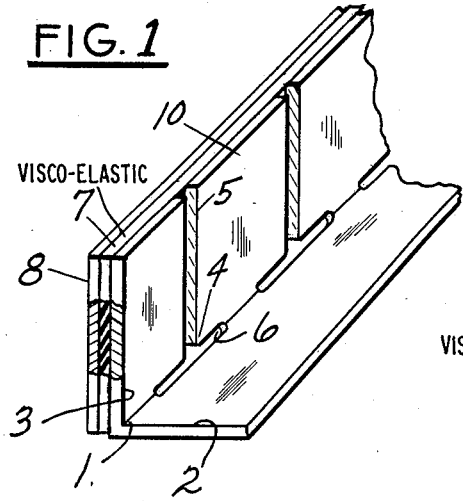
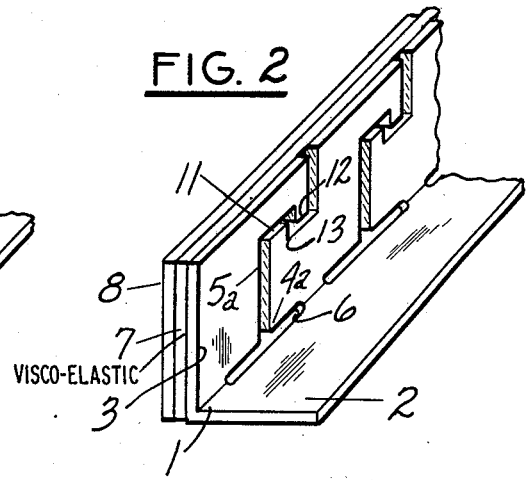
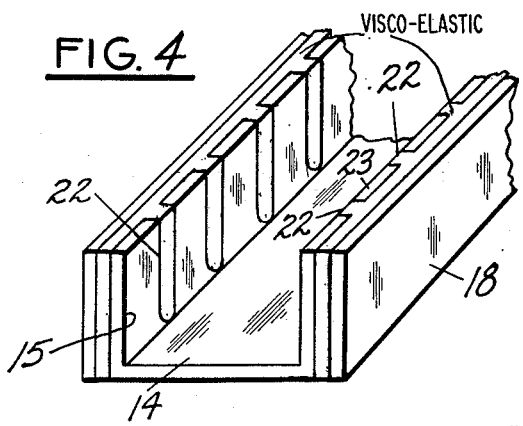
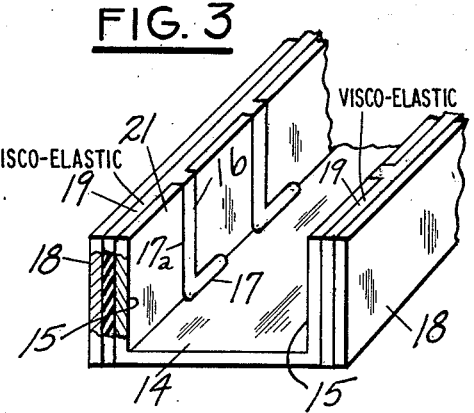
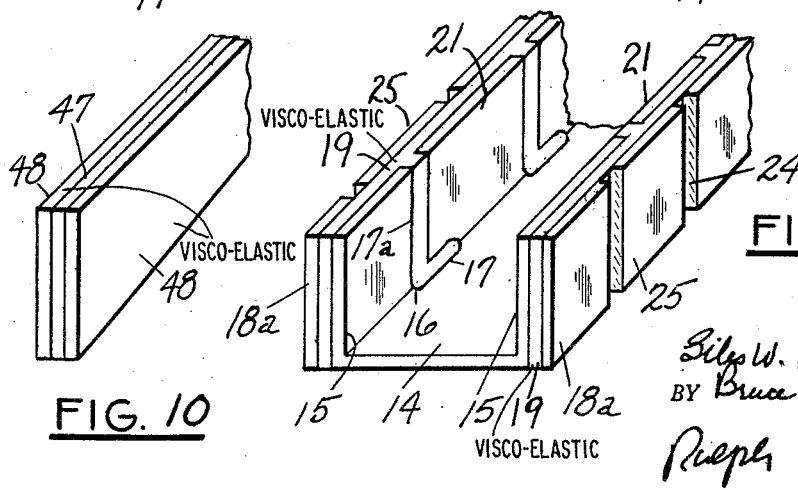

Feb. 26, 1963 B. W. CAMPBELL ET AL 3,078,969
DAMPED BEAM
Filed June 15, 1959 2 Sheets-Sheet 2
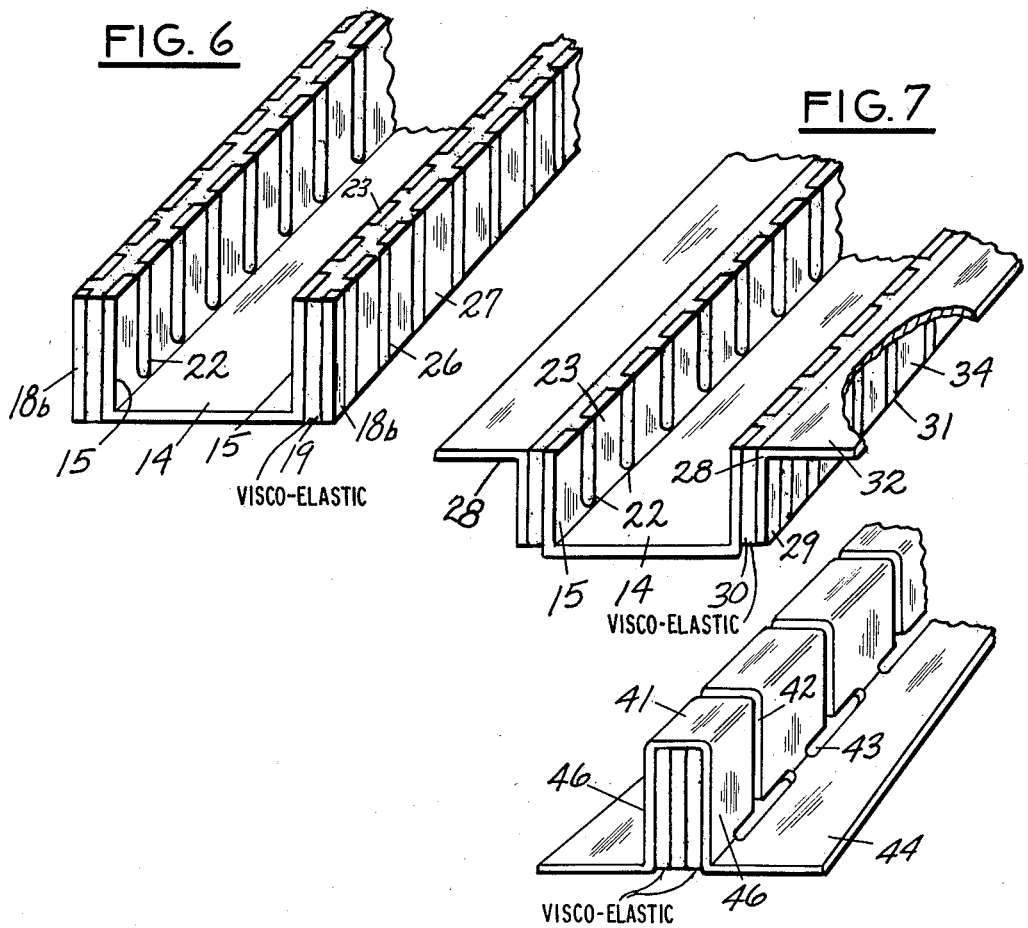
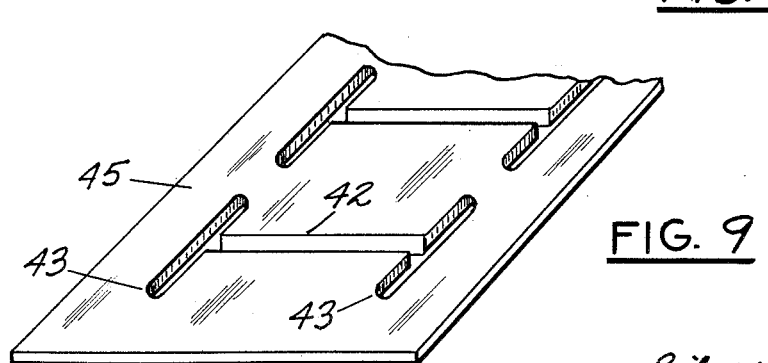
INVENTOR.
Giles W Painter
BY Bruce W Campbell
Ralph Hammar
Attorney

United States Patent Office 3,078,969
Patented Feb. 26, 1963

3,078,969
DAMPED BEAM
Bruce W. Campbell and Giles W. Painter, Erie, Pa., assignors to Lord Manufacturing Company, Erie, Pa., a corporation of Pennsylvania
Filed June 15, 1959, Ser. No. 820,448
16 Claims. (Cl. 189—37)

This invention is a damped metal beam constructed to damp or reduce the amplitude of vibration. The damping results from shearing of an intermediate layer of visco-elastic material connecting two members having slots in one or both of the members. While the slots weaken the members, the strength is regained to a considerable extent when the members are joined or cemented together by the visco-elastic material.

In the drawing, FIGS. 1 and 2 are perspectives of damped beams of angle section, FIGS. 3, 4, 5 and 6 are perspectives of damped beams of channel section, FIG. 7 is a perspective of a damped beam of combined channel and angle section, FIG. 8 is a perspective of a damped beam of T-section, and FIG. 9 and 10 are perspectives of the parts of the FIG. 8 beam.

The beam of FIG. 1 has a metal angle section 1 having sides or flanges 2 and 3. The vertical flange 3 has spaced along its length cuts in the form of T-slots 4, each comprising a vertical slot 5 extending the full height of the flange 3 and a horizontal slot 6 at the junction of the flanges 2 and 3. By reason of the T-slots, the angle section, when subjected to vertical load, would bend about an axis at the horizontal flange 2. The T-slots 4 so weaken the vertical flange 3 that it contributes little, if anything, to the rigidity of the angle section under vertical load. The vertical flange 3 is joined or cemented by a visco-elastic layer 7 to a vertical metal plate 8. Since there are no cuts in the plate 8, it would bend under vertical load about an axis substantially midway between its top and bottom edges. Bending stress results in relative movement between the plate 8 and the sections 10 between the T-slots 4 in the direction to shear the visco-elastic layer 7. The layer 7 has a stiffness low compared to the stiffness of the angle section 1 or the plate 8 so there is a resultant shear strain of the layer 7 which produces a damping force due to the internal damping of the layer. If the material of the layer 7 had a stiffness equal to that of the angle section 1 and plate 8, then it would form a solid connection between the two parts and no damping action would take place. From one aspect, the slots 4 reduce the bending stress which would be present in the vertical flange 3 if the cuts were omitted and substitutes in its place a shearing stress in the visco-elastic layer 7. If the slots 4 were omitted, most of the energy would be stored in bending stresses in the vertical flange 3 and there would be little, if any, shear stress in the layer 7. The rigidity of the beam in the vertical direction will depend on the stiffness of the plate 8, the modulus of the visco-elastic layer 7 and the thickness of the visco-elastic layer. If the modulus of the visco-elastic material is sufficiently high and the thickness sufficiently small, the stiffness of the beam can approach that of an undamped beam having the same dimensions as the basic structural component 1 but with no slots.

The damped beam of FIG. 2 is the same construction as FIG. 1 except for the shape of the T-slots 4a. The horizontal slot 6 at the head of the T is the same as in FIG. 1. The vertical slot 5a does not go straight across the vertical flange 3 but at its upper end has stepped sections 11 and 12 providing an interlocking joint 13 between the sections 11 and 12. Whenever the load is large enough to cause a deflection sufficient to take up the clearance in the interlocking joint 13, the vertical flange 3 of the angle section 1 thereafter behaves as though it were unslotted. The slots accordingly are effective under normal load in the same manner as the T-slot 4 in FIG. 1 but under heavy load, the beam is much stiffer, due to the takeup of the clearance in the joints 13. Under normal loads, the T-slots 4a have the same weakening effect on the angle section 1 and the damping action due to shearing of the visco-elastic layer takes place. Under heavy load, the weakening effect of the T-slots 4a is substantially nullified, and accordingly the damping action due to shear of the layer 7 is also substantially nullified.

The beam of FIG. 3 has a channel section having a web 14 with vertically extending flanges 15 at opposite edges. The flanges have L-shaped slots 16 spaced along the length with horizontal sections 17 at the junction of the flanges with the web and vertical sections 17a extending the full height of the flanges. The slots 16 weaken the channel section so that under vertical load it tends to bend about an axis substantially at the web 14. The flanges 15 contribute negligibly to the vertical load carrying capacity. On the outside of each of the flanges 15 is a vertical plate 18 joined to the adjacent flange by a visco-elastic cement layer 19. Under vertical load, the plates 18 tend to bend about an axis substantially midway between the top and bottom edges. Under vertical load, there is a shearing action between the plates 18 and the sections 21 between the slots 16 which produces a shear strain in the visco-elastic layers 19 resulting in a damping action.

The beam structure of FIG. 4 is substantially the same as FIG. 3 except for the slots 22 in the flanges 15. The slots 22 have the same effect, namely of weakening the channel member so that under vertical load it tends to bend about an axis substantially at web 14. Under vertical load, there accordingly is a shearing action between the plates 18 and the sections 23 between the slots 22 which results in the same kind of damping action as in FIG. 3.

The beam structure of FIG. 5 has the same channel member as in FIG. 3 and differs in that the plates 18a have vertical slots 24 which extend completely across the plate and are staggered with reference to the L-shaped slots 16 in the flanges of the channel. Under vertical load there is a shear strain on the layer 19 between the sections 21 and the sections 25 between the slots 24 in the plate 18a.

The beam structure of FIG. 6 has the channel section of FIG. 4 with the slots 22 in the flanges 15. The plates 18b cemented to the outside of the flanges 15 by the visco-elastic layers 19 have slots 26 extending completely across the plates on the same spacing as the slots 22 but staggered with respect to the slots 22 so that the sections 27 between the slots 26 overlap the slots 22. The shearing action in the visco-elastic layers 19 is the same as in FIG. 5.

The beam structure of FIG. 7 uses the same channel section as FIG. 4 with slots 22 in the flanges 15 which weaken the channel section so that under vertical load it tends to bend about an axis substantially at the web 14. On the outside of each of the flanges 15 is an angle section 28 having a vertical flange 29 cemented to the flange 15 by a visco-elastic layer 30. The vertical flange 29 of the angle section is cut by slots 31 on the same spacing but staggered with respect to the slots 22. The cuts 31 weaken the angle sections 29 so that under vertical load it bends about an axis substantially at the outwardly extending flanges 32. Under vertical load, there is a shearing action between the sections 23 of the flanges 15 and the sections 34 of the sides 29 of the angles 28. This shearing action introduces damping by shear strain of the layers 30.

The beam structure of FIG. 8 is of T-section with the rib 41 cut by T-slots 42 having horizontal sections 43 substantially at the junction between the rib 41 and the outwardly extending flanges 44. The T-section may be conveniently made by folding the sheet 45 illustrated in FIG. 9. Sandwiched between the vertical sides 46 is a vertical plate 47 cemented to the sides 46 by visco-elastic layers 48. The T-slots 42 weaken the T-section so that under vertical load it tends to bend about an axis substantially at the flanges 44. The axis about which the plate 47 bends is determined by the presence or absence of slots in the plate. If unslotted, the plate 47 tends to bend about an axis midway between its upper and lower edges. If the plate 47 is slotted, its stiffness will be changed and the axis about which it tends to bend under load will be shifted depending upon the shape and length of the slots. The slots could go completely across the plate 47. In any case, under vertical load there is a shear between the plate 47 and the sides 46 of the T-section producing the shear stress in the layers 48 which results in the damping.

In all forms of the damped beam one of the structural members has a series of rigid sections which move relative to rigid sections of the other structural member and produce a shear strain in a visco-elastic layer cementing the structural members together. The visco-elastic layer has high internal damping and a stiffness which is less than the stiffness of the structural members with the result that the visco-elastic layer does not materially interfere with the shear strain producing the damping. The damping materially reduces the amplitude or severity of vibration of the beam under resonance.

In some cases, the damped beam is used as a structural member and in other cases it is fastened to another structure such as a panel to reduce vibration of the other structure.

What is claimed as new is:

1. A damped beam comprising a first structural member having a series of longitudinally spaced rigid sections projecting from one side of the member and separated from each other by slots between adjacent sections having open ends remote from said one side of the member, another structural member opposite the space between and overlapping and united to at least two adjacent rigid sections by a visco-elastic layer of high internal damping and of stiffness substantially less than the stiffness of the structural members, said layer being subjected to shear strain by bending strain of the beam.

2. The beam of claim 1 in which the other structural member has a plurality of longitudinally spaced open ended slots in staggered relation to the slots in the first mentioned structural member.

3. A damped beam comprising a first structural member having a longitudinally extending angle section with a flange projecting from one side in the direction of bending load and having a series of longitudinally spaced slots therein with open ends remote from said side, another structural member opposite the space between and overlapping and united to at least two adjacent rigid sections by a visco-elastic layer of high internal damping and of stiffness substantially less than the stiffness of the structural members, said layer being subjected to shear strain by bending strain of the beam.

4. The beam of claim 3 in which the first mentioned structural member is of T-section with the flange comprising the stem of the T.

5. The beam of claim 4 in which the flange has spaced sides and the other structural member is between and united to both of said spaced sides by visco-elastic layers.

6. A damped beam comprising a structural member of channel section with flanges extending outwardly from the flanges of the channel, longitudinally spaced slots in the web and channel flanges, and another structural member united to the web of the channel by a visco-elastic layer of stiffness substantially less than the stiffness of the structural members.

7. A damped beam comprising a flanged member, a series of longitudinally spaced open ended slots in the flange, and a plate opposite and bridging said slots and united to said flange on opposite sides of said slots by a visco-elastic layer of high internal damping and of stiffness substantially less than the stiffness of the structural members, said layer being subjected to shear strain by bending strain of the beam.

8. A damped beam of structural members comprising a channel having flanges with a series of longitudinally spaced slots therein, two angles each having a flange spaced from and parallel to the web of the channel and a flange extending toward the web of the channel and united respectively to one and the other of the flanges of the channel by a visco-elastic layer of high internal damping and of stiffness substantially less than the stiffness of the structural members, said layer being subjected to shear strain by bending strain of the beam.

9. A damped beam comprising two metal plates with opposed surfaces in overlapping relation and secured to each other by an intermediate visco-elastic layer united to the opposed surfaces and of stiffness substantially less than the stiffness of the plates, both plates having longitudinally spaced open ended slots extending part way across the plates and intersecting the surfaces united to said visco-elastic layer and with the metal in one plate opposite the slots in the other plate.

10. A damped beam comprising two metal plates in overlapping relation and secured to each other by an intermediate visco-elastic layer of stiffness substantially less than the stiffness of the plates, both plates having longitudinally spaced slots with slots in one plate in staggered relation to slots in the other plate and with slots extending completely across one plate and breaking it into discrete units.

11. A damped beam comprising a first structural member having two sections extending in angular relation from a junction, one of the sections extending edgewise in the direction of the bending load and having a series of longitudinally spaced rigid sections formed by longitudinally spaced slots extending toward the junction from the edge of said one section remote from the junction and joining other longitudinally spaced slots at the junction, and another structural member opposite the space between and overlapping and united to at least two adjacent rigid sections by a visco-elastic layer of high internal damping and of stiffness substantially less than the stiffness of the structural members, said layer being subjected to shear strain by bending strain of the beam.

12. A damped beam comprising a first structural member having two sections extending in angular relation from a junction, one of the sections extending edgewise in the direction of the bending load and having a series of longitudinally spaced rigid sections formed by longitudinally spaced T-shape slots extending toward the junction from the edge of said one section remote from the junction with the head of the T at the junction of the angularly related sections, and another structural member opposite the space between and overlapping and united to at least two adjacent rigid sections by a visco-elastic layer of high internal damping and of stiffness substantially less than the stiffness of the structural members, said layer being subjected to shear strain by bending strain of the beam.

13. A damped beam comprising a first structural member having two sections extending in angular relation from a junction, one of the sections extending edgewise in the direction of the bending load and having a series of longitudinally spaced rigid sections formed by longitudinally spaced slots extending toward the junction from the edge of said one section remote from the junction, the slots having interengaging portions spaced from the neutral axis of said first mentioned structural member and providing an interlocking joint with normally spaced sides transverse to said neutral axis which engage under bending stress to form a solid connection between adjacent rigid sections, and another structural member opposite the space between and overlapping and united to at least two adjacent rigid sections by a visco-elastic layer of high internal damping and of stiffness substantially less than the stiffness of the structural members, said layer being subjected to shear strain by bending strain of the beam.

14. A damped beam comprising a first structural member having a series of longitudinally spaced rigid sections projecting in one direction transverse to its longitudinal axis and separated from each other by slots between adjacent sections and having open ends remote from its longitudinal axis, another structural member having a series of longitudinally spaced rigid sections projecting from said member transverse to its longitudinal axis in a direction opposite to the direction of projection of said first rigid sections, the rigid sections of said other member being separated from each other by slots between adjacent sections and having open ends remote from its longitudinal axis, the rigid sections of the first and other member being in staggered relation to each other and being united to each other by a visco-elastic layer of high internal damping and of stiffness substantially less than the stiffness of the structural members, said layer being subjected to shear strain by bending strain of the beam.

15. A damped beam comprising a first structural member having its central part of channel section and having its outer part comprising flanges remote from the web extending transverse to the sides of said channel, said central part having at least one slot intermediate its ends through the web and sides of said channel whereby portions on opposite sides of the slot are relatively rigid as compared to the section at the bottom of the slot and under load said first member bends primarily about the section at the bottom of the slot, a second structural member bridging said portions on opposite sides of the slot of the first member, and a visco-elastic layer between and joined to said second member and said portions on opposite sides of the slot in said first member.

16. The method of damping a structure subject to vibratory bending deflection and having an open ended slot extending in from one edge thereof which weakens its resistance to said deflection, which comprises arranging another structure with a surface in spaced and opposed relation to a surface of the first structure with a section of said surface of the other structure in bridging relation to the slot and overlapping said surface of the first structure on opposite sides of the slot, and joining the structures by an intervening layer of visco-elastic material adhesively united to said opposed surfaces and characterized by high internal damping and by stiffness less than the stiffness of the structures whereby deflection of the first structure is transferred to the other structure by shear stress on the visco-elastic layer and the resultant internal friction damps said deflection, said slot intersecting the surface of the first structure united to the visco-elastic layer.

References Cited in the file of this patent

UNITED STATES PATENTS

| | | |
|---|---|---|
| 2,138,175 | Keys | Nov. 29, 1938 |
| 2,252,938 | Lord | Aug. 19, 1941 |
| 2,257,804 | Lord | Oct. 7, 1941 |
| 2,258,550 | Frese | Oct. 7, 1941 |
| 2,272,639 | Jack | Feb. 10, 1942 |
| 2,378,515 | Tidwell | June 19, 1945 |

FOREIGN PATENTS

| | | |
|---|---|---|
| 513,171 | Great Britain | Oct. 5, 1939 |
| 142,244 | Australia | July 16, 1951 |
| 371,873 | Italy | Aug. 6, 1939 |